US005389426A

United States Patent [19]

Arens et al.

[11] Patent Number: 5,389,426

[45] Date of Patent: Feb. 14, 1995

[54] ARTICLE FOR USE IN FORMING A PERMANENT IMAGE USING A TEMPORARY MARKER

[75] Inventors: Robert P. Arens, St. Paul; James M. Ripka, Zimmerman, both of Minn.

[73] Assignee: Minnesota Mining and Manufacturing Company, St. Paul, Minn.

[21] Appl. No.: 8,194

[22] Filed: Jan. 25, 1993

[51] Int. Cl.[6] .................... B32B 3/00

[52] U.S. Cl. .................... 428/195; 428/206; 428/304.4; 428/321.1; 156/156; 156/660

[58] Field of Search .................... 156/156, 660; 428/304.4, 312.6, 321.1, 195, 206, 913

[56] References Cited

U.S. PATENT DOCUMENTS

| | | | |
|---|---|---|---|
| 2,854,350 | 9/1958 | Phillpotts | 117/36 |
| 3,506,344 | 4/1970 | Thomas | 35/9 |
| 3,826,499 | 7/1974 | Lenkoff | 273/130 B |
| 4,299,880 | 11/1981 | Arens | 428/304 |
| 4,374,889 | 2/1983 | Arens | 428/207 |
| 4,418,098 | 11/1983 | Maistrovich | 427/161 |
| 4,428,321 | 1/1984 | Arens | 116/217 |
| 4,629,330 | 12/1986 | Nichols | 368/89 |
| 4,729,687 | 3/1988 | Arens | 401/198 |
| 4,877,253 | 10/1989 | Arens | 273/240 |

*Primary Examiner*—Patrick J. Ryan
*Assistant Examiner*—William A. Krynski
*Attorney, Agent, or Firm*—Gary L. Griswold; Walter N. Kirn; Leland D. Schultz

[57] ABSTRACT

A porous material having a top surface and a bottom surface, and a dye applied to the bottom surface of the porous material. The dye is soluble in a volatile imaging liquid contained in a suitable marker, such that when the volatile liquid contacts the top surface of the porous media, the volatile liquid penetrates the porous media, dissolves at least some of the dye to provide a dye solution with at least some of the dye solution migrating to the top surface, and evaporates leaving a permanently visible mark of dye residue on the top surface of the porous material.

19 Claims, 2 Drawing Sheets

ARTICLE FOR USE IN FORMING A PERMANENT IMAGE USING A TEMPORARY MARKER

FIELD OF THE INVENTION

The present invention relates generally to articles which display an image when treated with an imaging liquid, and more particularly, to an article which uses a colorless volatile imaging liquid to form a permanent image on a substrate.

BACKGROUND OF THE INVENTION

Colorless volatile imaging liquids have been used for some time to develop a temporary image which then disappears when the imaging fluid evaporates. Volatile imaging liquids thereby permit the substrate to be used over and over again. In the bingo industry it is desirable that the volatile imaging liquid evaporate in less than four hours so that the bingo cards are ready to be played again.

One method of developing a temporary image is by using transparentizing fluids which fill microvoids in a substrate or substrate coating material. Reusable sheet materials using a micro-porous layer and a transparentizing fluid are discussed in a number of patents. For example, U.S. Pat. No. 4,299,880 to Arens discloses a microvoid-containing sheet material that is capable of displaying indicia when contacted with the appropriate colorless volatizing liquid and which is sufficiently durable that it cannot readily be transparentized by the application of heat or pressure. At least one surface of the reusable sheet material is coated with an opaque microporous layer comprising particles having a refractive index in the range of about 1.3 to 2.2, preferably about 1.4 to 1.8. The particles are incorporated in a binder which has a refractive index in the same range as the particles, interconnected microvoids being present throughout the layer and being open to the exposed surface of the sheet material. When liquid having a refractive index approximating that of the particles and the binder is applied to the microporous surface layer, the liquid penetrates the microvoids in the layer, thereby reducing its reflectivity in the intermediate vicinity of such penetration, imparting transparency and visually exposing the underlying surface of the base. Other examples of the use of transparentizing fluids and microporous sheet materials are discussed in U.S. Pat. Nos. 4,418,098; 4,729,687; 4,428,321; and 4,877,253.

Such microporous sheets are particularly attractive for use with reusable bingo cards as evidenced by U.S. Pat. No. 4,877,253. The bingo industry has substantially replaced markers that can be accidentally moved, such as chips, with colored ink markers. Applicators used to form these markers are commonly referred to as "dabbers", "markers" or "daubers". Dabbers that apply permanent colored ink are messy and lead to substantial waste since the card can be used only once. Alternately, the dabbers can be used to dispense a clear, volatile imaging liquid which forms a temporary marking image by imparting a transparentizing effect appearance when applied to the top surface of a microporous sheet bingo card. When the imaging liquid evaporates the bingo card returns to its normal appearance so that it can be used several times.

However, it is still a fairly common practice in bingo parlors today to provide players with conventional bingo cards or "tear opens" which are meant to be permanently marked and as such these cards are often permanently marked using a traditional colored ink marker and thus are good for only one game. Alternatively, U.S. Pat. No. 3,826,499 discloses an invisible printing ink which leaves a permanent mark on a bingo card when the invisible ink is chemically reacted with a marking pen. The invisible ink is a suitable acid or base material which is applied to the top surface of the bingo card and when the marking pen is applied the ink changes color via a chemical reaction and becomes visible.

Because games requiring a permanent image are often played concurrently with games using the more modern bingo cards in combination with a volatile liquid marking dabber, there is a substantial inconvenience and expense in having to use two different marking dabbers. It is therefore desirable to provide a marking system whereby a single marker may be used to form a temporary mark on one substrate, and a permanent mark on a second substrate.

SUMMARY OF THE INVENTION

The present invention includes an article for use in forming a permanent image. The article comprises a porous material having a top surface, and a dye applied to the porous material beneath the top surface. The dye is soluble in an imaging liquid such that when the imaging liquid contacts the top surface of the porous media, the imaging liquid penetrates the porous media, dissolves at least some of the dye such that at least some of the dye migrates to the top surface, and the imaging liquid evaporates and leaves a permanently visible mark of dye residue on the top surface of the porous material.

The imaging liquid is contained within a marker. Preferably, the imaging liquid is volatile and colorless and usable on a substrate for making a temporary mark. Thus, the present invention is particularly useful in the bingo industry, although it has broad application to other fields as well.

DETAILED DESCRIPTION OF THE PREFERRED EMBODIMENTS

Figure 2:
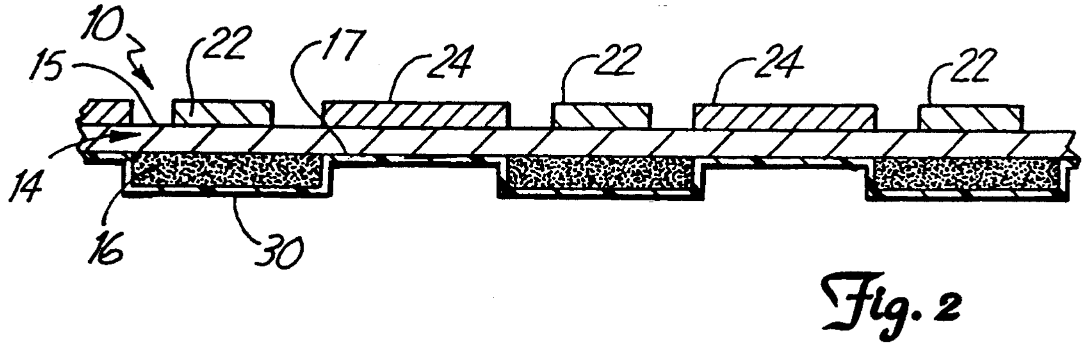
FIG. 2 is a cross-sectional view of the bingo card before being dabbed with an imaging liquid.
Figure 3:
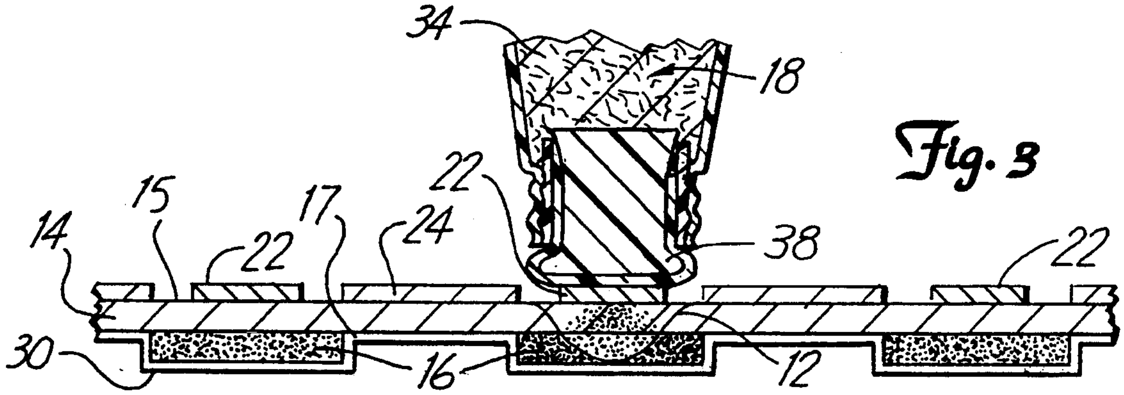
FIG. 3 is a sectional view of the bingo card as it is being dabbed with the imaging liquid.
Figure 4:
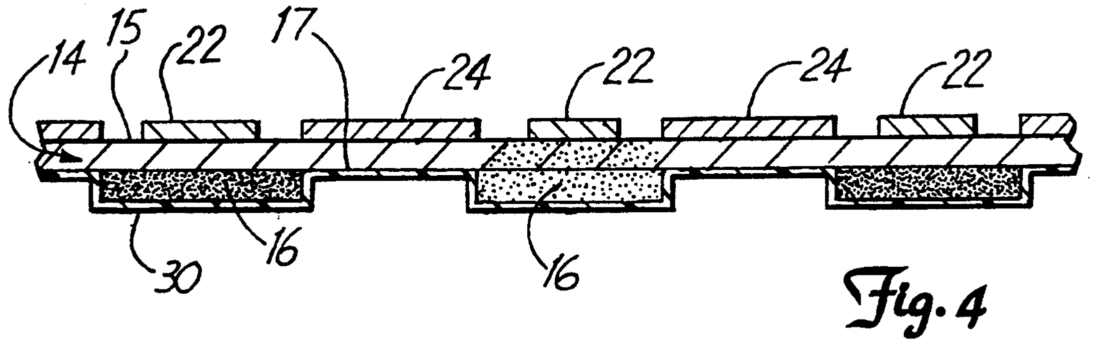
FIG. 4 is a sectional view of the bingo card after it has been dabbed with the imaging liquid and after the imaging liquid has evaporated.

The present invention provides an article 10 which is capable of being permanently marked using an imaging liquid 12. Referring to FIGS. 2–4, the article 10 comprises porous material 14 having a top surface 15 and a bottom surface 17, and a dye 16 applied to the bottom surface 17. The imaging liquid 12 is applied to the porous material 14 using an applicator or dabber 18.

The porous material 14 may be of any construction provided the porosity permits the imaging liquid 12 to penetrate into the porous material 14 from the top surface 15 and reach the dye 16 below. When the imaging liquid contacts the dye 16, at least some of the dye 16 dissolves in the imaging liquid 12 and is drawn upward to the top surface 15 of the porous material 14 where it leaves a permanently visible mark of dye residue.

Figure 1:
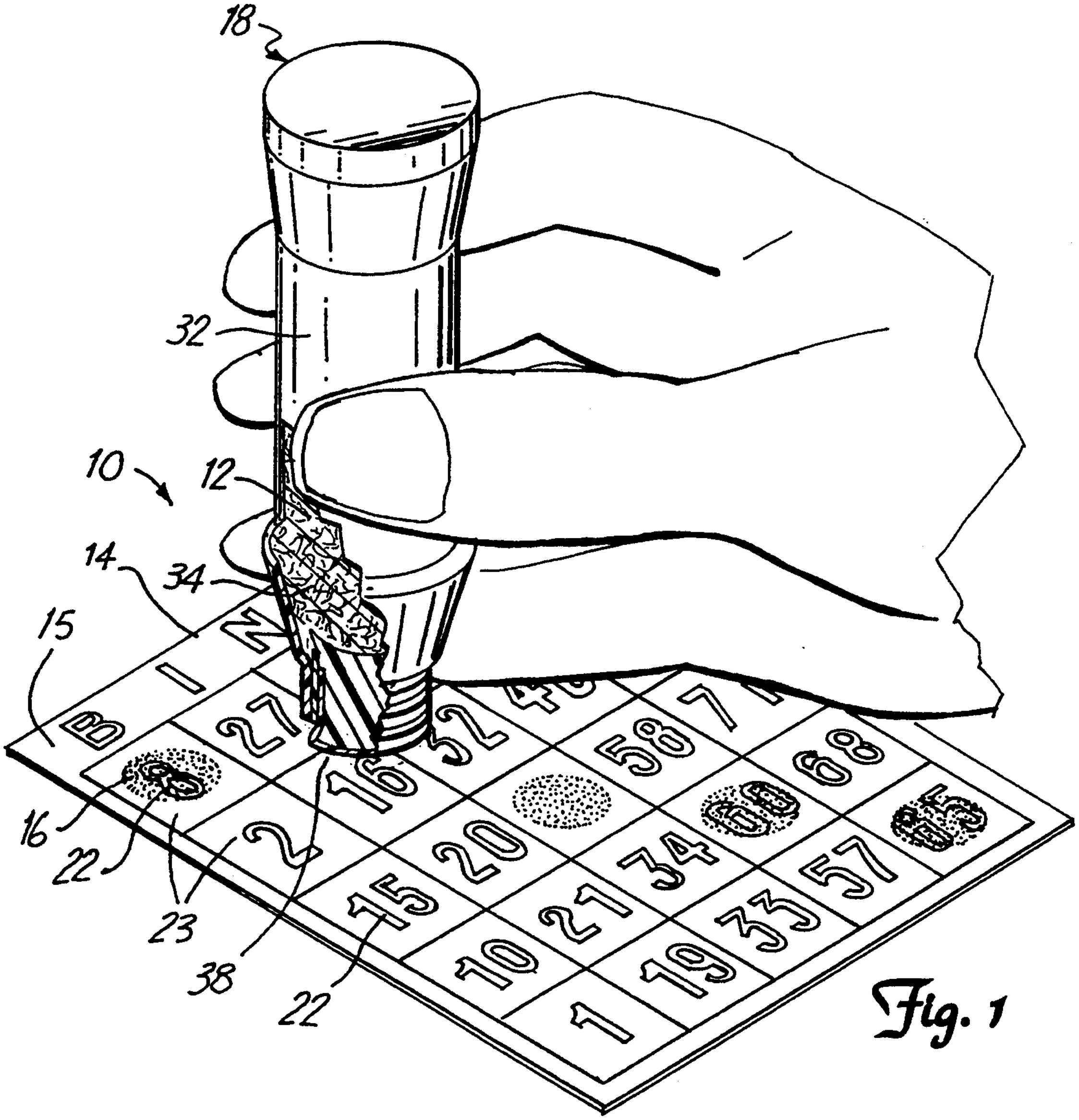
FIG. 1 is a perspective view of a bingo card of the present invention.

Referring to FIG. 1, the porous material 14 is preferably any type of porous paper such as Mead 20 lb. coated front paper, NCR 20 lb. coated paper, or standard 50 lb. offset paper. The porous material 14 may be imprinted with a plurality of indicia 22 which for a bingo card are one and two digit numbers. Additionally, the bingo card may be imprinted with a plurality of discrete areas 23, such as quadrilaterals, wherein each discrete area 23 is associated with selected indicia 22. The colors of the indicia 22, the dye 16, the imaging liquid 12 and the porous material 14 are preferably visibly distinguishable from each other.

The imaging liquid 12 is stored in the dabber 18 until applied to the porous material 14. The imaging liquid 12 may be of any composition provided that the imaging liquid 12 dissolves at least some of the dye 16 to cause at least some of the dye 16 to migrate to the top surface 15 of the porous material 14. In other words, the particular imaging liquid 12 that is used in the present invention depends on the particular dye 16 that is used. Preferably, the imaging liquid 12 is a colorless, volatile marking liquid such as is used in a reusable bingo card system. Reusable bingo card systems includes bingo cards having a surface treated to receive a marking liquid that evaporates after a predetermined period of time, enabling the card to be reused. Typically, a "temporary" image on a reusable bingo card lasts less than four hours while a "permanent" image lasts more than four hours.

The construction of the reusable bingo cards and marking fluids is specifically discussed in U.S. Pat. No. 4,877,253. By using a colorless and volatile imaging liquid 12, the same dabber 18 can be used with both the reusable and non-reusable bingo cards. The imaging liquid 12 when applied to a reusable bingo card constructed in accordance with the teachings of the patents listed above creates a temporary mark which disappears when the imaging liquid evaporates, while the same imaging liquid 12 when applied to the article 10 of the present invention creates a permanent mark that remains visible on the porous material 14 even after the imaging liquid 12 evaporates.

Referring to FIGS. 2–4, in the preferred embodiment, the imaging liquid 12 consists essentially of a clear, colorless, odorless, and innocuous liquid. By innocuous is meant that the liquid neither dissolves nor degrades the porous material 14 to which it is applied. Additionally, the imaging liquid 12 is substantially 100% volatizable, having an evaporation rate on the order of preferably between 20 to $10^{-3}$ (compared to n-butyl acetate=1) so that the imaging liquid will evaporate in less than about 4 hours. For other applications, an imaging liquid having an evaporation rate of less than $10^{-3}$ may be selected to give a longer lasting image. After application of the imaging liquid 12 to the porous material 14 of either the reusable or non-reusable bingo cards, the card has a "wet" appearance; the imaging liquid 12 then evaporates essentially completely so that the top surface 15 of the porous material 14 is dry. An aliphatic hydrocarbon such as a C-13 liquid paraffin such as is available from Exxon Company USA, Downers Grove, Ill. 60515, under the trademark "NORPAR 13" is one example of a volatile imaging liquid 12 suitable for use with the present invention. Other examples of imaging liquids 12 suitable for use with both the reusable and non-reusable bingo cards preferably include innocuous imaging liquids such as esters, aliphatics and glycols in general.

The viscosities of the imaging liquids 12 are typically in the range of 0.5 to 200 centipoise (CPS) at about 25 degrees celsius. Although the viscosity of the imaging liquid 12 does not affect whether or not the liquid will flow through the porous material 14, the viscosity does affect the rate at which the imaging liquid 12 flows. Preferably, the viscosity should be low enough and the pores size of the porous material 14 large enough to permit essentially instantaneous penetration of the imaging liquid 12 to impart a transparentizing effect to the porous material. The only time requirement of the imaging liquid penetrating to the dye 16 to provide a dye solution to draw the dye 16 upwards to the top surface 15 is that the dye be present at the top surface 15 when the transparentizing effect is no longer visible. The dabber 18 must release enough imaging liquid 12 in a fraction of a second so that the tip of the dabber 18 does not remain in contact with the top surface 15 of the porous material 14 long enough for the tip of the dabber 18 to become contaminated with the dye 16, as illustrated in FIG. 3.

The dye 16 may be of any composition, preferably solid, provided that the dye 16 is soluble in the imaging liquid 12. In other words, the particular dye 16 that is used in the present invention depends on the particular imaging liquid 12 that is used. When the imaging liquid 12 penetrates the porous material 14 and reaches the dye 16, the dye 16 dissolves in the imaging liquid 12 to provide a dye solution and the dye solution diffuses into and through the porous material 14. When the imaging liquid 12 evaporates from the porous material 14, a permanently visible residue 20 of dye 16 remains on the top surface 15. Preferably, the dye 16 need only be applied to the bottom surface 17 of the porous material 14 in discrete areas where corresponding images are desired to be formed on the top surface 15. The preferred method of applying the dye 16 to the cards is by using a flexographic printing station. On bingo cards, the dye 16 is usually applied in a pattern of circles behind each indicia 22 printed on the top surface 15. Suitable dyes that are believed to have utility in the context of the present invention include Oil blue A, Oil red, rhodamine red, crystal violet, and basic dyes. A preferred dye 16 is Bingo Red ID No. MIV3391 manufactured by Cork Industries, Inc. of Folcroft, Pa. 19032.

The following table is a non-limiting list of possible combinations of the various dyes 16 and imaging liquids 12 which may be used together in the present invention:

| Dye | Imaging Liquid |
| --- | --- |
| crystal violet | alcohol |
| Oil blue A | aliphatic hydrocarbon |
| Oil red | aliphatic hydrocarbon |
| rhodamine red | glycol |
| basic dyes | water, alcohol, methylene chloride |

Preferably, a protective coating 30 is applied to the bottom side 17 of the porous material 14 and covers the dye 16 to prevent the dye 16 or imaging liquid 12 from seeping onto and contaminating other surfaces such as an underlying bingo card of the same construction. The coating 30 is applied after the dye 16 has been applied to the porous material 14. The coating 30 may be of any composition provided that the coating 30 is insoluble in the imaging liquid 12 and the dye 16 is not soluble in the coating 30. The coating 30 is preferably a UV-cured coating such as manufactured by Pierce & Stevens, Inc. of Carol Stream, Ill. 60188. Other protective coatings 30 include acrylics and oxidizable varnishes such as linseed oil.

The porous material 14 may be treated with a patterned barrier material 24 which limits areas of penetration of the imaging fluid 12 so that a well defined image is formed. The barrier material 24 is essentially imperceptible with normal viewing or to the touch. The barrier material 24 may be applied either to the top surface 15 of the porous material or throughout the porous material 14, provided that the barrier material 24 is present in a pattern so that the imaging liquid 12 can penetrate non-barrier treated areas to dissolve the dye 16. The application of the barrier material 24 is set forth in U.S. patent application Ser. No. 07/869,139. In the embodiment shown in FIGS. 1–4, the barrier material 24 is applied on the top surface 15 of the porous material 14 around each of the indicia 22 so that only the dye 16 associated with a particular indicia 22 is contacted when that indicia 22 is marked with the dabber 18.

Examples of useful barrier materials include oleophobic fluorochemical materials such as chromium complexes of $R_fSO_2N(R')RCOOH$, where $R_f$ is a perfluoroalkyl group containing 4–20 carbon atoms, R is an alkylene bridging group containing 1–12 carbon atoms, and R' is H or an alkyl group containing 1–6 carbon atoms; U.S. Pat. No. 2,934,450 discloses such fluorochemicals. Another suitable class of oleophobic fluorochemicals is defined by the structural formula $[R_fSO_2N(R)R'O]_mPO(OX)_{3-m'}$, wherein $R_f$ is as just defined, R is H or an alkyl group having 1–12 carbons atoms, R' is an alkylene bridging group having 2–12 carbon atoms, X is H, $NH_4$, Na or $NH_2(C_2H_4OH)_2$, and m is 1 or 2; U.S. Pat. No. 3,094,547 discloses such fluorochemicals.

Figure 5:
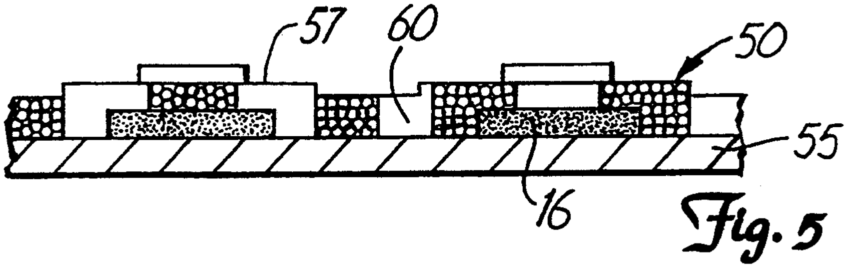
FIG. 5 is a sectional view of another embodiment of a bingo card of the present invention.

FIG. 5 shows an alternative embodiment of the present invention in which the article 10 has an exposed microporous layer 50 disposed on a base 55 and the dye 16 being disposed between the microporous layer 50 and the base 55. The microporous layer 50 may be transparentizable when the imaging liquid 12 is applied to a top surface 57 of the exposed microporous layer 50 in order to increase the visibility of the mark (the mark being a combination of the temporary transparentizing appearance of the mark, until the imaging liquid 12 evaporates, and the permanent dye residue, which remains on the top surface 57 of the microporous layer 50 even after the imaging liquid 12 evaporates).

The construction of a transparentizable microporous layer 50 is disclosed, for example, in U.S. Pat. Nos. 4,299,880; 4,418,098; 4,729,687; 4,428,321; and 4,877,253. The transparentizable microporous layer 50 comprises particles having an index of refraction of from about 1.3 to 2.2 which is preferably similar to the index of refraction of the imaging liquid 12. The particles are incorporated in a binder which has a refractive index in the same range as the particles, interconnected microvoids being present throughout the microporous layer 50 and being open to the exposed surface of the base 55 and the dye 16. When imaging liquid 12, (having a refractive index approximating that of the particles and the binder), is applied to a top surface 57 of the microporous layer 50, the imaging liquid 12 penetrates the microvoids in the layer, thereby reducing its reflectivity in the intermediate vicinity of such penetration, imparting transparency and visually exposing the underlying surface of the base. In addition, the imaging liquid 12 penetrates the microporous layer 50, dissolves at least some of the dye 16 to provide a dye solution with at least some of the dye solution migrating to the top surface 57 such that a mark of dye residue remains permanently visible on the top surface 57 of the microporous layer 50. The dye solution may also penetrate into the base 55 such that a mark of dye residue remains permanently visible in the base 55.

The dabber 18 includes a bottle 32 or like container having an exterior adapted for manual engagement and manipulation and a wicking member 34. Preferably the bottle 32 is a molded polymeric structure constructed of polyester, polypropylene, polystyrene, nylon or like materials, but most preferably, is constructed of molded high density polyethylene such as is available from Dominion Bingo and Novelties, 333 Guildwood, Hamilton Ontario, Canada, L9C 7B4. Preferably, the wicking member 34 is constructed of a fibrous material, such as a web of polymeric fibers, such as polypropylene, polyethylene, nylon, polyester or blends thereof, cellulose, either in the form of cotton or paper, or, alternatively, cotton cloth. The wicking member 34 must have the desired capillary characteristics to enable the imaging liquid 12 to move from an interior chamber of the bottle 32 through an opening 38 exteriorly of the bottle 32 for application to the top surface 15 of the porous material 14. Additionally, the application of the imaging liquid 12 must take place fast enough so that the dye 16 does not stain the tip of the dabber. With the preferred viscosity range indicated above for the imaging liquid 12, it is preferred that the wicking member 34 have a capillarity in the range of 5 to 50 centimeters. The preferred interfiber distance is approximately 0.4 to 40 microns. The preferred fiber diameter is between approximately 3 to 400 microns. Fiber shape is of lesser importance, as long as the preferred fiber-to-fiber distance is maintained.

Capillarity or "suction potential" is defined as a measure of the resultant forces acting to move the liquid through the porous wicking member where the only external factor is gravity. Other factors affecting capillarity are: surface tension of the liquid, density of the liquid, and pore sizes of the wicking member. One way to determine the capillarity or suction potential of the porous wicking member is to calculate the vertical height to which a liquid will be drawn into the wicking member. For this calculation the equation is:

$$h=s/4dDg,$$

where h is the height of the wicking member in centimeters, s is the surface tension of the imaging liquid in grams per second squared (dynes per centimeter), d is the smallest continuous intersurface distance (pore size) in the wicking member in centimeters, D is the density of the imaging liquid in grams per cubic centimeter, and g is gravity as 980 centimeters per square second (See *Perry's Chemical Engineer's Handbook*, Fourth Edition, Section 15, p. 39).

One way to insure that a proper amount of imaging liquid 12 is dispensed per dab, is by controlling the pore size of the wicking member 34. To select a wicking member 34 that will work on a given imaging liquid, first determine that the liquid wets the porous material 14, then knowing the vertical height requirement of the dabber, the pore size can be calculated as follows:

$$d=s/4hDg,$$

wherein the variables are as described above. Other factors used in determining the proper amount of imaging liquid to disperse per dab include the dab duration (that is, the length of time the dabber is in contact with the sheet), and the size of the dab tip used to disperse the imaging liquid 12. Dabbers other than the one described above may be used to dispense imaging liquid onto the porous material as will be apparent to those skilled in the art.

As an aid to understanding the present invention, attention is directed to the following illustrative but non-limiting examples.

EXAMPLE 1

A red dye (Bingo Red #MIV3391) was coated in discrete areas onto the back side of a porous 20 lb. paper sheet and allowed to dry. The top surface of the sheet was then dabbed with an imaging liquid (C-13 liquid paraffin). When dabbed in areas having no dye on the opposite surface, the liquid evaporated completely to leave no visible mark on the paper. When dabbed in areas where the dye had been applied to the opposite surface, a permanent image was left on the top surface. Areas containing dye and not containing dye could be alternately dabbed, and in no case did dye contaminate the dabber tip so that it could not be used to leave an image that disappeared completely. As such, the same dabber, using only one imaging liquid, could be used to leave both a permanent and a temporary mark on the porous sheet.

EXAMPLE 2

A blue dye (Oil blue A) was coated in discrete areas onto the back side of a porous 20 lb. paper sheet and allowed to dry. The top surface of the sheet was then dabbed with an imaging liquid (trisdecane). When dabbed in areas having no dye on the opposite surface, the liquid evaporated completely to leave no visible mark on the paper. When dabbed in areas where the dye had been applied to the opposite surface, a permanent image was left on the top surface. Areas containing dye and not containing dye could be alternately dabbed, and in no case did dye contaminate the dabber tip so that it could not be used to leave an image that disappeared completely. As such, the same dabber, using only one imaging liquid, could be used to leave both a permanent and a temporary mark on the porous sheet.

EXAMPLE 3

In a bingo card construction a soluble dye was applied to discrete areas on the backside of a porous paper sheet by a flexographic printing device and overcoated with a protective coating. The top side of the sheet was then printed with indicia opposite the dye-printed areas in the form of one and two digit numbers and with discrete areas such as quadrilaterals that separate the indicia. Both the quadrilaterals and indicia were printed in a permanent visible ink that is a different color than the soluble dye on the backside. The top surface was also coated with a patterned barrier material such as FC-807 available from Minnesota Mining and Manufacturing Company, of St. Paul, Minn., applied as a 40% by weight solution in propylene glycol to limit areas of penetration of the imaging liquid so that a well-defined marker image was formed. When the dabber was used to apply imaging liquid to a particular indicia number, a permanent dye image remained on the top surface after the imaging liquid evaporated. As in the previous examples, the same dabber and imaging liquid were used to mark an area away from the areas containing dye to form a temporary image that disappears completely after the imaging liquid evaporated from the porous sheet.

EXAMPLE 4

A 4.35% dispersion of oil blue A dye in water was applied to one side of porous newsprint paper and dried. The dried dye layer was overcoated with a dried porous layer composed of 75% by volume crushed marble and 25% by volume acrylic resin. C-13 paraffin was dabbed onto the marble coated side. After the C-13 dried, a permanent visible blue stain remained on the marble surface. The dabber tip remained unstained.

Although the present invention has been described with reference to Bingo cards, it has broader application to other fields as well. For example, an article capable of displaying a permanent image using a volatile imaging liquid may also be useful for incorporation in security devices, counterfeit detection devices, expiration indicators, and various games other than Bingo.

The present invention further encompasses a combination of an applicator as described herein, along with a first substrate which permanently displays a first image such as herein described, along with a second substrate which temporarily displays a second image. The second substrate may be as described in the Arens '253 patent, previously described herein. Thus, the present invention provides for a dabber with a single volatile marking liquid which may be used to permanently mark one substrate and temporarily mark another, as may be found advantageous.

Although the present invention has been described with reference to preferred embodiments, workers skilled in the art will recognize that changes may be made in form and detail without departing from the spirit and scope of the invention. Thus, the scope of the present invention is limited not by the particular embodiments disclosed herein, but rather by the structure described by the claims, and the equivalents of those structures.

What is claimed is:

1. An article capable of being permanently marked by an imaging liquid, the article comprising:
   - a porous material having a top surface and a bottom surface; and
   - a dye applied to the bottom surface of the porous material, the dye being soluble in the imaging liquid such that when the imaging liquid contacts the top surface of the porous material the imaging liquid penetrates the porous material, dissolves at least some of the dye to provide a dye solution with at least some of the dye solution migrating to the top surface such that a mark of dye residue remains permanently visible on the top surface of the porous material.

2. The article of claim 1, wherein the imaging liquid is volatile.

3. The article of claim 1, wherein the imaging liquid is colorless.

4. The article of claim 1, wherein the porous material is a sheet material having an exposed porous layer.

5. The article of claim 4, wherein the sheet material is imprinted with a plurality of indicia.

6. The article of claim 5, wherein the exposed porous layer is imprinted into a plurality of discrete areas, the areas being associated with selected indicia.

7. The article of claim 6, wherein each of the plurality of discrete areas has an associated discrete area containing dye.

8. The article of claim 5, wherein the plurality of indicia are imprinted in a color visibly distinguishable from the dye.

9. The article of claim 1, further comprising a patterned barrier material for substantially preventing the penetration of the imaging liquid, the barrier material being applied to the top surface of the porous material.

10. The article of claim 1, further comprising a protective coating for preventing the dye from contaminating other surfaces, the protective coating being applied over the dye, and the protective coating being insoluble in the imaging liquid.

11. The article of claim 1, wherein the porous material is in the form of a sheet having an exposed microporous layer which is transparentizable when the imaging liquid is applied to the exposed microporous surface, the imaging liquid and the microporous layer having a similar index of refraction.

12. A method of permanently marking an article, comprising the steps of:

providing a porous material having a top surface and a bottom surface, and a dye applied to the bottom surface of the porous material;

providing a dabber containing an imaging liquid capable of penetrating the porous material when applied to the porous material; and dabbing the porous material with the dabber such that the imaging liquid is transferred to the top surface of the porous material wherein the imaging liquid penetrates the porous material, and dissolves at least some of the dye to provide a dye solution such that at least some of the dye solution migrates to the top surface of the porous material leaving a permanently visible mark of dye residue.

13. The method of claim 12, wherein the imaging liquid is volatile.

14. The method of claim 12, wherein the imaging liquid is colorless.

15. In combination:

a volatile imaging liquid contained in an applicator; and a first substrate which permanently displays a first image when the imaging liquid is applied thereto; and a second substrate which temporarily displays a second image when the imaging liquid is applied thereto.

16. The combination of claim 15, and the first substrate comprising:

a porous material having a top surface and a bottom surface; and a dye applied to the bottom surface of the porous material, the dye being soluble in the volatile imaging liquid such that when the imaging liquid contacts the top surface of the porous material the imaging liquid penetrates the porous material, dissolves at least some of the dye to provide a dye solution with at least some of the dye solution migrating to the top surface, and evaporates leaving a permanently visible mark of dye residue on the top surface of the porous material.

17. The combination of claim 15, and the second substrate comprising:

a porous material in the form of a sheet having an exposed microporous layer which is transparentizable when the imaging liquid is applied to the exposed microporous surface, the imaging liquid and the microporous layer having a similar index of refraction.

18. In combination:

an imaging liquid contained in an applicator; and a first substrate which permanently displays a first image when the imaging liquid is applied thereto, the first substrate comprising a porous material having a top surface and a bottom surface; and a dye applied to the bottom surface of the porous material, the dye being soluble in the imaging liquid such that when the imaging liquid contacts the top surface of the porous material the imaging liquid penetrates the porous material, dissolves at least some of the dye to provide a dye solution with at least some of the dye solution migrating to the top surface such that a permanently visible mark of dye residue remains on the top surface of the porous material.

19. The combination of claim 18, further comprising:

a second substrate which temporarily displays a second image when the imaging liquid is applied thereto.

* * * * *